Patented June 20, 1944

2,352,022

UNITED STATES PATENT OFFICE 2,352,022

PROCESS FOR STABILIZING CELLULOSE ESTERS

Aladar Schuller, Antwerp, and Remi-Gustaaf Tritsmans, Mortsel, near Antwerp, Belgium; vested in the Alien Property Custodian No Drawing. Application September 3, 1941, Serial No. 409,348. In Austria February 25, 1935

7 Claims. (Cl. 260—230)

Our invention relates to cellulose esters and more especially to the stabilization of solid organic acid esters of cellulose in accordance with our copending application for Patent Serial No. 64,793, of which the present application is a continuation-in-part.

As is well known, cellulose esters as prepared from cellulose and organic acids or acid anhydrids in the presence of catalysts and solvents or agents preventing solution, are subject to decomposition and not stable. More especially the sulfuric acid, which is the most widely used catalyst and which combines with the cellulose, forming mixed cellulose sulfate esters, is known to greatly impair the stability of the organic cellulose esters, such as the acetates, propionates and butyrates, from which films and other photographic materials are prepared.

A great many suggestions have been made regarding stabilization of such esters, but none of them has been found altogether satisfactory. More especially washing of the esters with water and dilute acids at normal or increased pressure has been found useless because at ordinary temperature these washing agents remain substantially ineffective for the purpose in view, while at elevated temperature they exert a saponifying action on the cellulose esters whereby these latter are impaired. Treatment with aliphatic acids or alkyl esters of such acids at elevated temperature has been found to also injure the cellulose esters. Methyl alcohol as such or mixtures of this alcohol with water, mineral oil products, benzene or carbon tetrachloride, when contacted with cellulose esters at ordinary temperature have not been found capable of imparting to cellulose esters the stability required to render them fit for use in the manufacture of photographic materials.

We have now found that the lower fatty acid esters of cellulose and quite especially the acetates, for instance cellulose triacetate, however also mixed esters, can be stabilized in a highly satisfactory manner by treating them at an elevated temperature, preferably above 50° C. and better still at temperatures in the neighborhood or above 100° C., however preferably not beyond 140° C. after washing to remove any free acid, with a hydrocarbon of the group consisting of benzene, toluene, xylene and benzine or a mixture of two such compounds. Any one of the hydrocarbons here named at these temperatures does not suffer decomposition with the liberation of an acid or alkali, is inert with respect to and does not dissolve the organic cellulose ester, such as for instance cellulose triacetate, and renders the liberated acid, for instance sulfuric acid, innocuous by entering into chemical combination with it.

Benzene, toluene, xylene and commercial benzine have been tested and found useful as stabilizing agents at temperatures ranging between about 50° and 140° C., under and above normal pressure, the cellulose ester, such as cellulose triacetate, if treated for a sufficient period of time, on being heated one hour to 230° C., substantially retaining its color.

We have found that the treatment according to this invention is not by any means a mere washing process. For while free sulfuric acid can be extracted by washing, the mixed cellulose sulfate esters formed during esterification of cellulose in the presence of sulfuric acid cannot be washed out. We feel certain that it is the elevated temperature which is responsible for the stabilizing effect obtained by our treatment, in that the mixed cellulose sulfate ester is decomposed at this temperature and the sulfuric acid is set free so that it can be bound by chemical reaction and removed by washing.

We have further found that the absolute temperature at which this stabilizing treatment is carried out, plays an important role in that it determines the duration of this treatment.

A typical example of the influence of the temperature on the result of this treatment is the following: A cellulose triacetate, after two hours boiling in xylene at 60° C., on being heated one hour to 200° C., showed an appreciable brown coloration, while, when treated with xylene two hours at 130° C., one hour's heating to 200° C. did not in any way change the pure white color of the ester. This shows clearly that it is the heat that is the principal factor, which fully agrees with the theory advanced by us that stabilization will be obtained only if the mixed ester which contains the radical of the catalyst acid, such as the organic cellulose sulfate ester, is decomposed and the catalyst acid, such as sulfuric acid, set free so that it can be removed by washing.

The upper temperature limit is determined by the temperature up to which the material to be stabilized may be heated without being affected detrimentally.

Our findings also account for the fact that with the liquids mentioned above, when applied at normal temperature, no adequate degree of stability is obtained even if they are allowed to act on the cellulose ester several days.

This interrelation between the temperature and the length of time required for stabilization enables us to adapt our process to the particular nature of the material to be treated. Cellulose esters which are injured when exposed to a high temperature, are stabilized at a correspondingly low temperature in a correspondingly longer period of time, while others which are less sensitive to heat, may be stabilized at a higher temperature and in a correspondingly shorter period of time.

In every case the results obtained are the better and more reliable, the higher the temperature of treatment and it is therefore advisable to operate at as high a temperature as possible in each individual case. However, when stabilizing cellulose triacetate, the temperature should not substantially exceed 130° C., since at 140° C. decomposition would set in.

We have found benzene to be particularly suitable as stabilizing liquids, since this substance is available at low cost and does not in any way affect cellulose esters at temperatures such as may be used in our process.

If it should be desired to use low boiling liquids, for instance in order to enable the stabilized product to be dried rapidly at low temperature, the stabilizing treatment should be carried through in a closed vessel, i. e. under pressure above normal and consequently at a higher temperature.

The stabilizing liquid may be recovered by distillation with steam.

*Examples*

1. 100 parts cotton cellulose are treated with a mixture of 600 parts acetic anhydrid, 1000 parts benzene and 2 parts sulfuric acid. Acetylation is followed by centrifuging and washing out with benzene to remove any free acid. The product is cellulose triacetate in fibrous state. The still unstable product is placed in a container and 1200 parts benzene are added. The container is then closed hermetically and heated to about 120° C., the internal pressure being thereby raised to about 3 atms. After two hours the liquid is drained off and the traces of benzene expelled from the triacetate with steam. The triacetate now possesses excellent stability. A sample, when heated one hour at 200° C., does not show any brown discoloration.

2. 100 parts cotton cellulose are treated with a mixture of 400 parts acetic anhydrid, 200 parts butyric acid, 3 parts sulfuric acid and 1000 parts toluene. The esterification-product, a mixed ester in fibrous state is treated, after centrifuging and washing out with toluene, four hours with 1000 parts toluene at 90° C. The product thus obtained, when heated one hour to 200° C., retains its white color.

Various changes may be made in the details disclosed in the foregoing specification without departing from the invention or sacrificing the advantages thereof.

We claim:

1. The method of stabilizing lower fatty acid esters of cellulose containing bound acid components which comprises washing the solid ester to remove any free acid and digesting the solid ester thus obtained at a temperature above 50° C. but not exceeding 140° C. with an acid-free liquid hydrocarbon selected from the group consisting of benzene, toluene, xylene and benzine.

2. The method of stabilizing cellulose acetates containing bound acid components which comprises washing the solid ester to remove any free acid and digesting the solid ester thus obtained at a temperature above 50° C. but not exceeding 140° C. with an acid-free liquid hydrocarbon selected from the group consisting of benzene, toluene, xylene and benzine.

3. The method of stabilizing cellulose triacetates containing bound acid components which comprises washing the solid ester to remove any free acid and digesting the solid ester thus obtained at a temperature above 50° but not exceeding 140° C. with an acid-free liquid hydrocarbon selected from the group consisting of benzene, toluene, xylene and benzine.

4. The method of claim 1, wherein the low boiling hydrocarbon is benzene.

5. The method of claim 1, wherein the low boiling hydrocarbon is toluene.

6. The method of claim 1, wherein the low boiling hydrocarbon is benzene.

7. The method of claim 1, wherein digestion is carried out under pressure whereby to materially raise the boiling point of the low boiling hydrocarbon.

ALADAR SCHULLER.
REMI-GUSTAAF TRITSMANS.